United States Patent [19]

Hohl et al.

[11] Patent Number: 4,523,055
[45] Date of Patent: Jun. 11, 1985

[54] VOICE/TEXT STORAGE AND RETRIEVAL SYSTEM

[75] Inventors: G. Burnell Hohl, Norwalk, Conn.; Donatas V. Gasiunas, Carmel, N.Y.

[73] Assignee: Pitney Bowes Inc., Stamford, Conn.

[21] Appl. No.: 555,262

[22] Filed: Nov. 25, 1983

[51] Int. Cl.³ .................. H04M 1/64; H04M 3/42; H04M 11/10
[52] U.S. Cl. .................. 179/2 DP; 179/6.17; 179/18 B
[58] Field of Search .................. 179/2 DP, 18 B, 6.17

[56] References Cited

U.S. PATENT DOCUMENTS

| | | | |
|---|---|---|---|
| 3,403,383 | 9/1968 | Kienzle et al. | 179/6.17 X |
| 3,475,557 | 10/1969 | Morse et al. | 179/2 DP |
| 3,728,486 | 4/1973 | Kraus | 179/18 B X |
| 4,221,933 | 9/1980 | Cornell et al. | 179/6.17 |
| 4,371,752 | 2/1983 | Matthews et al. | 179/18 B X |
| 4,375,083 | 2/1983 | Maxemchuk | 179/18 B X |
| 4,424,575 | 1/1984 | Clarke et al. | |
| 4,488,002 | 12/1984 | Seibel | 179/2 DP |

Primary Examiner—Keith E. George
Attorney, Agent, or Firm—William D. Soltow, Jr.; David E. Pitchenik; Robert H. Whisker

[57] ABSTRACT

The Voice/Text Storage System provides for the storage of digital data and digitized voice signals and is particularly suited for applications such as voice mail and voice annotation of text. The system includes a first bus operatively connecting a storage/network processor which controls access to a mass storage device, a host processor which provides overall control for the system and a communications processor. All processors have private memories connected to the processor CPU's directly so that the processors may continue to operate when the first bus is busy. The system also includes a second bus operatively connecting the storage/network processor, a voice transfer control unit, a buffer and voice transfer unit for receiving, digitizing and storing voice signals received over a plurality of telephone lines. The voice transfer unit also includes a switch and data carrier detection apparatus for selectively connecting digital data signals transmitted over the telephone lines to the communications processor.

46 Claims, 14 Drawing Figures

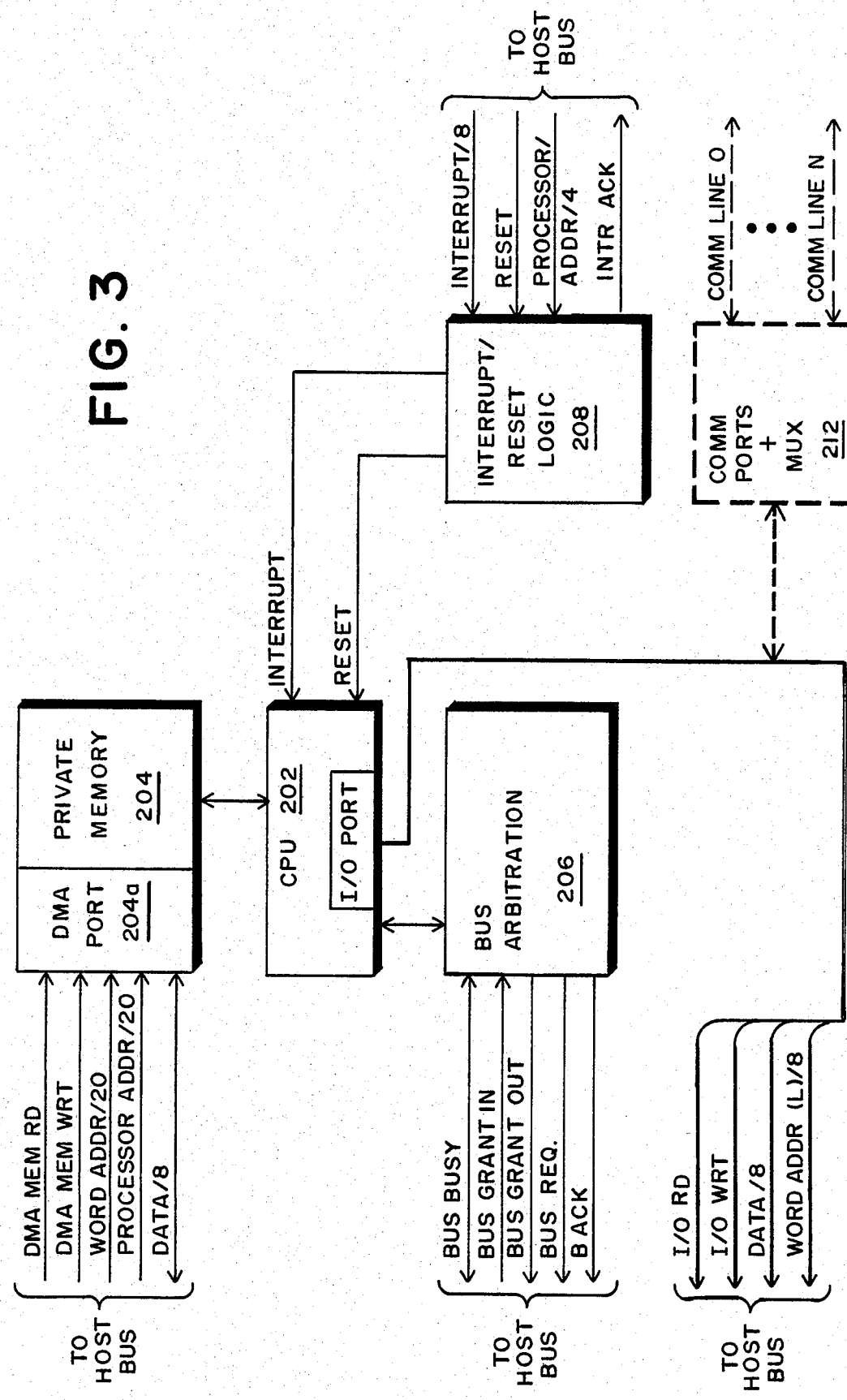

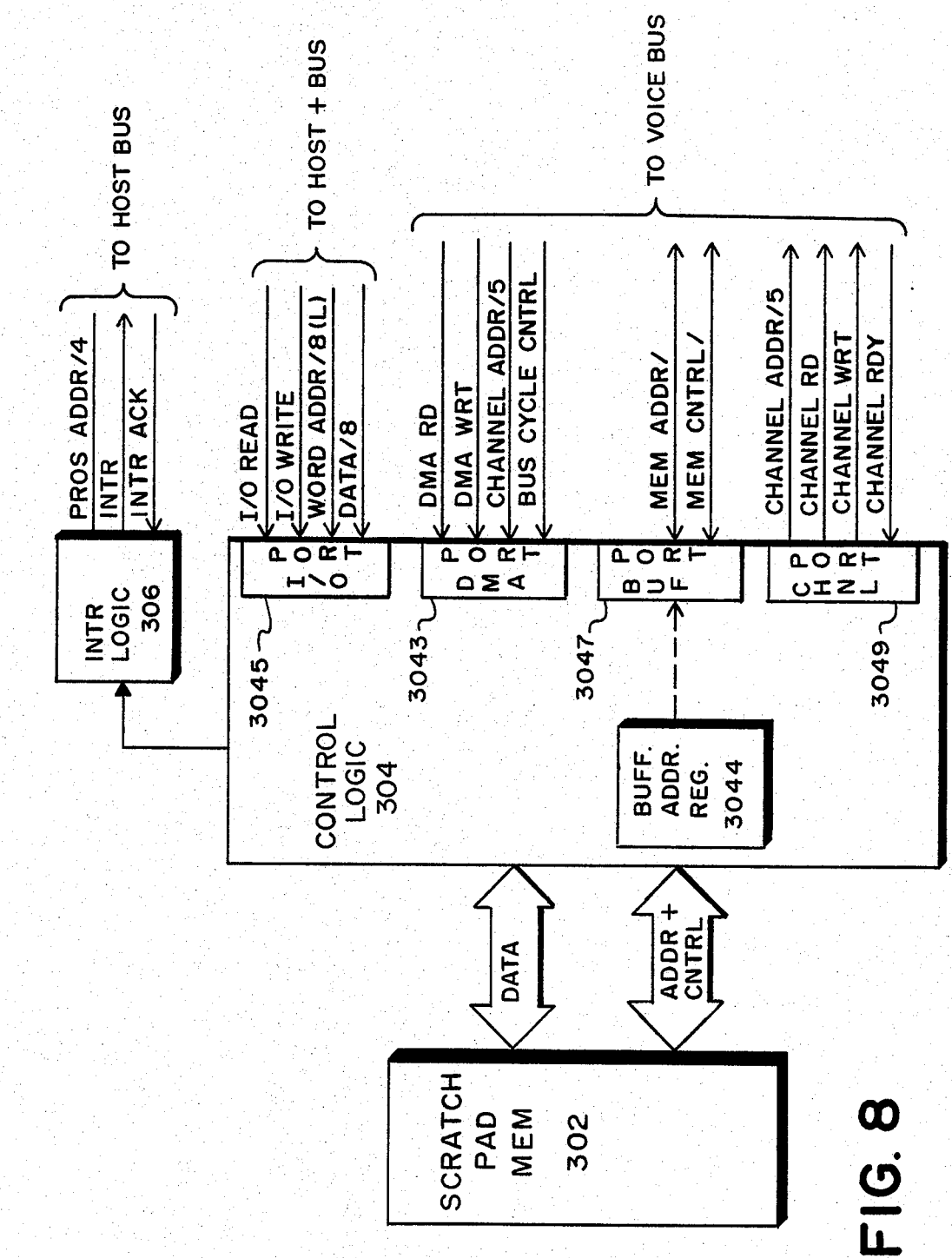

VOICE/TEXT STORAGE AND RETRIEVAL SYSTEM

BACKGROUND OF THE INVENTION

This invention relates to a data processing system and more particularly to a system particularly adopted to store, process and distribute digital data including both textual data and digitized voice signals. Such systems should be capable of handling a multiplicity of voice inputs and outputs, preferably over telephone lines, and have a capacity for storing a substantial quantity of digitized voice signals. Further, such a system should have the capacity for correlating such stored voice signals with digital signals representing textual data and commands so that functions such as "voice mail", i.e., storing and forwarding voice messages, centralized dictation and "voice annotation of text", i.e., correlated storage of verbal comments and corrections with stored textual material, so that word processing operator may update the text from voice.

While systems which have some integrated capacity for handling both voice signals and textual data are known, none have as yet provided the full range of voice functions described above in a manner which is compatible and readily intergratable with conventional local data processing networks. A particular problem has been that the high data rates necessary to handle multiple simultaneous digitized voice signals create a need for a multiple processor architecture, while the need for complex and frequent communications between processors, required to maintain coordination between various tasks involving both digitized voice signals and textual data, tended to place a large communications burden on each processor and so reduce its effective computing power. Even in systems where separate busses were provided for voice data and digital data use of the digital data bus for interprocessor communications still significantly reduced effective processing power.

In other systems where memory and processors shared the same bus, access by one processor to memory would necessarily interrupt the operations of other processors requiring access to memory, while other architectures where each processor had only private memory and the bus carried only I/O communications between processors were too slow when blocks of data had to be transferred between processor memories.

Further prior art bus structures were normally adapted for a particular processor or family of processors and choice of a bus structure tended to limit a system and further developments of that system to a particular family of processors.

Thus, it is an object of the subject invention to provide a data processing system having the capability to receive, store, process and transmit digital data were such data may be either textual data or digitized voice signals.

It is a further object of the subject invention to provide such a system where digital data and digitized voice signals may be stored in a correlated manner so as to provide for functions such as "voice annotation of text".

It is also an object of the subject invention to provide such a system using a multiprocessor architecture where the interprocessor communications burden is substantially reduced.

BRIEF SUMMARY OF THE INVENTION

The above objects are achieved and the disadvantages of the prior art are overcome by a Voice/Text Storage and Retrieval Apparatus which includes a digital mass storage device for storage and retrieval of digital data and digitized voice data, a first processor unit for controlling access to the mass storage device, a host processor unit for monitoring, coordinating and supervising the overall operation of the apparatus, a communications processor unit for reception and retransmission of digital data, and an interface for receiving and retransmitting digital data and analog voice signals. The interface includes detection circuitry for detecting the presence of digital data signals and switch circuitry controlled by the detection circuitry to separate the digital data signals from the analog voice signals and to route the digital data signals to the communications processor unit for transmission and reception. The apparatus also includes a converter which is connected to the switch circuitry so that the analog voice signals are routed to it for reception and transmission. The converter digitizes received analog voice signals and generates analog voice signals to be transmitted from a digital input. Still further, the subject apparatus includes, a buffer for buffering the flow of data to and from the converter, voice transfer control circuitry for controlling the transfer between the buffer and the converter; for signalling the host processor unit when a block of digitized voice signal data must be transmitted between the buffer and the mass storage device and for controlling that block transfer in response to signals from the first processor unit, a first bus interconnecting the first processor unit; the communications processor unit and the host processor unit so that digital data may be transferred between the communications processor unit and the mass storage device under control of the first processor unit and in response to commands from the host processor unit, and a second bus interconnecting the first processor unit; the voice transfer control circuitry; the buffer and the conversion means, so that digitized voice signal data may be transferred between the converter and so that the buffer under control of said voice transfer control circuitry and blocks of digitize voice signal data may be transferred between the mass storage device and the buffer under control of the voice transfer control circuitry and the first processor unit. The first bus is also connected to the voice transfer control circuitry so that the host processor unit may initiate transfer of digitized voice data signal transfers to and from the converter.

In a preferred embodiment the interface comprises a plurality of interface units each operatively connected to an associated telephone line to receive and transmit both voice and data signals. (As used hereinafter, the term "telephone line" is intended to include two wire lines from the switched telephone network, four wire private lines leased from telephone companies, privately installed lines such as those used for central dictation systems, and the like. Except for well understood differences in the analog circuitry needed to make connection to the line, such lines perform essentially the same function in the same way and a more detailed description of their operation is not necessary for an understanding of the subject invention).

In another preferred embodiment the converter comprises a plurality of converter units each operatively connected to switch circuity comprised in an associated interface unit for the reception and transmission of voice signals over the associated telephone line.

The above objects may also be achieved and the above disadvantages also overcome in accordance with the subject invention by means of a voice/text storage and retrieval apparatus comprising a mass storage device for storage and retrieval of both digital data and digitized voice signal data, communications and control circuitry for the generation and transfer of digital command and data signals, voice transfer circuitry for converting voice signals between digital and analog form and for transferring said voice signals to and from said mass storage means, an interface for interfacing a plurality of signal lines to the apparatus, the lines having the capability of transmitting both analog voice signals and serial digital data signals and the interface including detection circuitry and switch circuitry for separately routing the analog voice signals and digital data signals, and the voice/text apparatus further including a storage/network processor unit for controlling access to said mass storage device.

The communications and control circuitry and the voice transfer circuitry each include separate buses operatively connected to the storage/network processor unit for the transmission of digital command and data signals and of digitized voice signal data, respectively. Command signals for the overall control of the apparatus are generated by a host processor unit operatively connected to the communications and control bus and digital data signals are transferred between the interface and the storage/network processor unit by a communications processor unit operatively connected to the communications and control bus, and which includes serial signal lines operatively connected to the switch circuitry of the interface for the receiption and transmission of serial digital data signals.

In a preferred embodiment the storage/network processor unit further includes, a central processing unit having a private memory, first direct memory access device operatively connecting said storage/network processor unit to the communications and control bus, a second direct memory access device connecting said storage/network processor unit to the voice bus, the storage/network switch circuitry, controlled by the central processing unit, for connecting the first direct memory access device to the private memory, whereby the command signals may be transmitted between the central processing unit and the host processor unit, and for connecting either the first or second direct memory access device to the mass storage device, whereby either digital data or digitized voice signals may be stored on and retrieved from the mass storage device.

In another preferred embodiment the voice transfer circuitry is operatively connected to the communications and control bus and the voice transfer circuitry responds to command signals from the host processor unit to activate and de-activate communications with particular signal lines and to determine the direction of voice signal flow between the apparatus and particular ones of the signal lines and to selectively access segments of digitized voice data stored in the buffer for the creation of concatenated voice prompting messages.

In another embodiment the host processing unit and the communications processing unit communicate by transferring a block of data over the communications and control bus to the storage/network private memory for retransmittal by the storage/network processor unit to the other processing unit.

Thus, it may be seen that the subject invention advantageously provides an apparatus useful for the storage of both digital data and digitized voice signal data in a common mass storage device.

It is another advantage of the subject invention that the apparatus provides for the resolution of conflicts for access the mass storage device and for the correlated storage of digital data and related digitized voice signal data by a means of a processor unit which controls access to the mass storage device, so that a single processor may maintain a data base describing storage allocation on the mass storage device.

It is another advantage of the subject invention that the apparatus provides for receipt and transmission of both digital data and voice signals over common signal line, which is preferably a telephone line.

It is still another advantage of the subject invention that the apparatus provides a multiprocessor architecture suitable for use with a variety of microprocessor types on a common bus, and wherein interprocessor communications are all routed through and controlled by one particular processor.

Other objects and advantages of the subject invention will be apparent to those skilled in the art from consideration of the detailed description set forth below and of the attached drawings.

BRIEF DESCRIPTION OF THE DRAWINGS

FIG. 3 is a more detailed schematic block diagram of a typical Host, Auxillary Host or Communications Processor of the subject invention.

FIG. 8 is a more detailed schematic block diagram of the Voice Transfer Controller. FIG. 8a shows the layout of each channel buffer.

DETAILED DESCRIPTION OF A PREFERRED EMBODIMENT OF THE INVENTION

Figure 1:
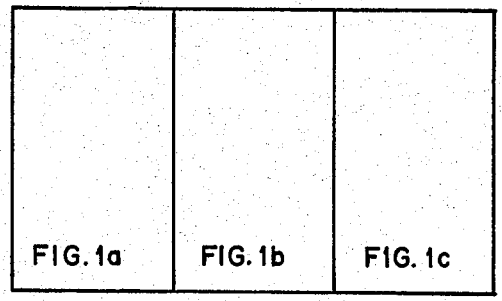
FIGS. 1a 1b and 1c when arranged as shown in FIG. 1 form a schematic block diagram of a voice/text storage and retrieval apparatus in accordance with the subject invention.

FIG. 1 shows a schematic block diagram of a data processing system in accordance with the subject invention, a system particularly adapted for the storage, retrieval and processing of both text and digitized voice signals. The system comprises Storage/Network Processor 100 which is operatively connected to Host Bus 10 and Voice Bus 20 for the transmission and reception of digital data, including textual data, and digitized voice signals. Also operatively connected to Storage/Network Processor 100 are a Hard Disk Controller 500, controlling one or more Winchester Disk Drives 502 and a Floppy Disk Controller 520, controlling a Floppy Disk Drive 522. Optionally Storage/Network Processor 100 may also include a communications port for interconnection with a High speed Network Interface 540, which may control a number of Intelligent Secretarial Work Stations 542 and Printers and other high speed devices 544, and a back-up device port for interconnection to a Tape Controller 560 which controls Tape Drive 562.

Also operatively connected to Host Bus 10 are Communications Processor 250 and Host Processor 200. Optionally additional Auxiliary Host Processors 210 and 220 may also be connected to Host Bus 10. In the embodiment described below provision is made for a total of up to sixteen (16) host processors to be connected to Host Bus 10.

Operatively connected to Voice Bus 20 are Voice Transfer Controller 300, Voice Buffer Memory 320 and a number of Voice Digitizer/Generator Circuits 340, each operatively connected to one of Telephone Interfaces 400. Provision is made for up to 32 telephone lines in the embodiment described below.

Telephone Interfaces 400 are capable of handling both voice and digital data and transmit digital data to Communications Processor 250 through dedicated asynchronous ports 256, using a standard interface such as the RS232 interface. Note that unused ports can be connected to devices such as Dumb Terminals 252 and Printers 254 to provide an alternative means for input or output of textual data to or from the system.

Telephone interfaces 400 are essentially standard modems with the additional capability to switch the signal to Voice Digitizer/Generator when it recognizes a voice signal, i.e., detects the absence of a carrier. Their design and construction would be readily apparent to a person skilled in the art and need not be discussed further here for an understanding of the subject invention.

Storage/Network Processor 100 provides and controls three major data paths as well as others less often used, or optional, data paths. The first major data path uses Host Bus 10 to transfer data between the memory of Storage Network/Processor 100 and the memories of any Host Processors 200, 210, 220, etc. or the memory of Communications Processor 250. (It is a feature of the subject invention that this data path provides the only method of interprocessor communications in the system.) The second main data path uses Host Bus 10 to transfer data between Winchester Disks 502 and Host Processor 200. This data path allows Host Processor 200 to operate a digital data stored on Winchester Disks 502 under control of an applications program stored in Host processor 200. The third major data path uses Voice Bus 20 to transfer digitized voice data between Winchester Disks 502 and Voice Buffer Memory 320. This data path allows voice signals to be stored on and retrieved from Winchester Disk 502.

A less frequently use data is provided for transferring digital data between Floppy Disk 522 and the memory of Storage Network Processor 100. This data path may be used for loading programs or other data into the system from a portable medium, i.e., floppy disks.

The data paths provided for optional High Speed Network Interface 540 and Back-up Tape Controller 560 are essentially conventional and are not necessary for an understanding of the claimed invention and so will not be described further here. Similarly, the connection of Dumb Terminals 252 and Printers 254 through Asynchronous Ports 256 are conventional and a further description of their operation is unnecessary to an understanding of the claimed invention and so will not be discussed further here.

STORAGE/NETWORK PROCESSOR

Figure 2:
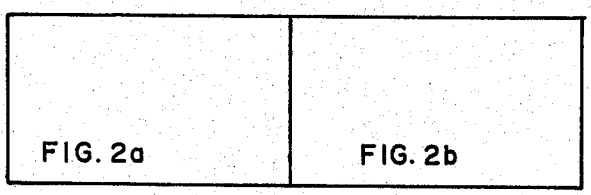
FIGS. 2a and 2b when arranged as shown in FIG. 2 form a more detailed schematic block diagram of the Storage/Network Processor of the subject apparatus.
Figure 1A:
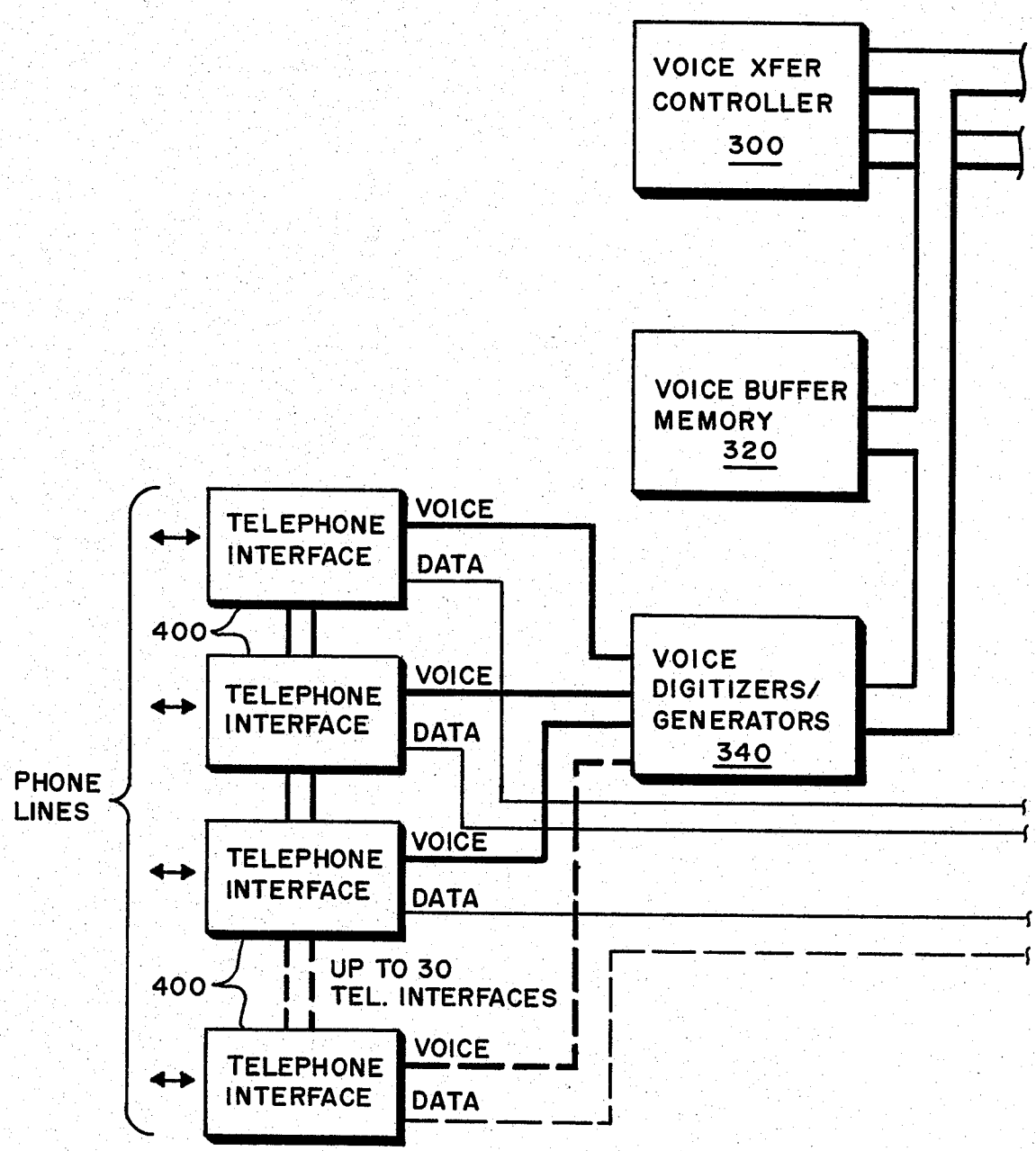
Figure 1B:
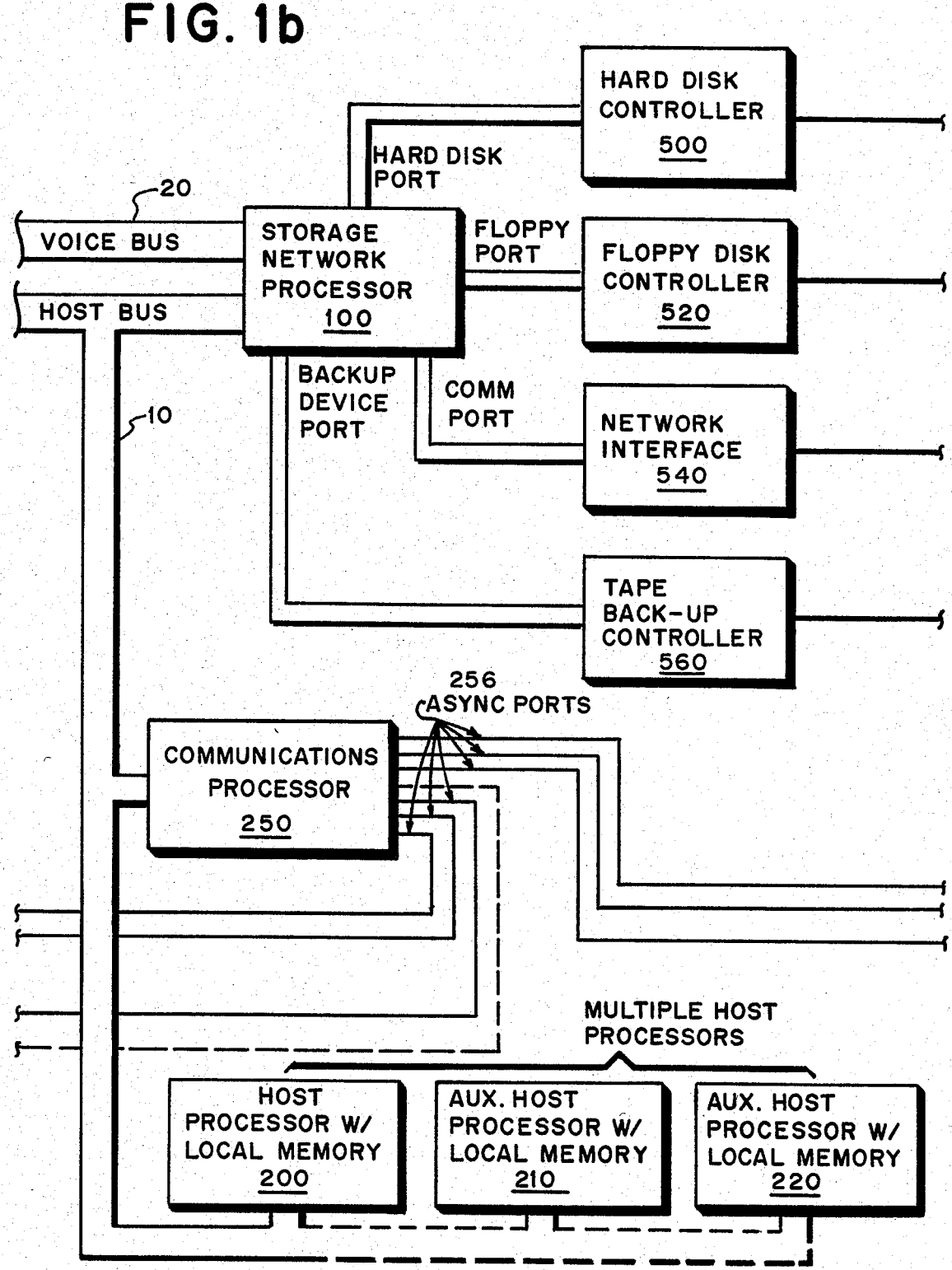
Figure 1C:
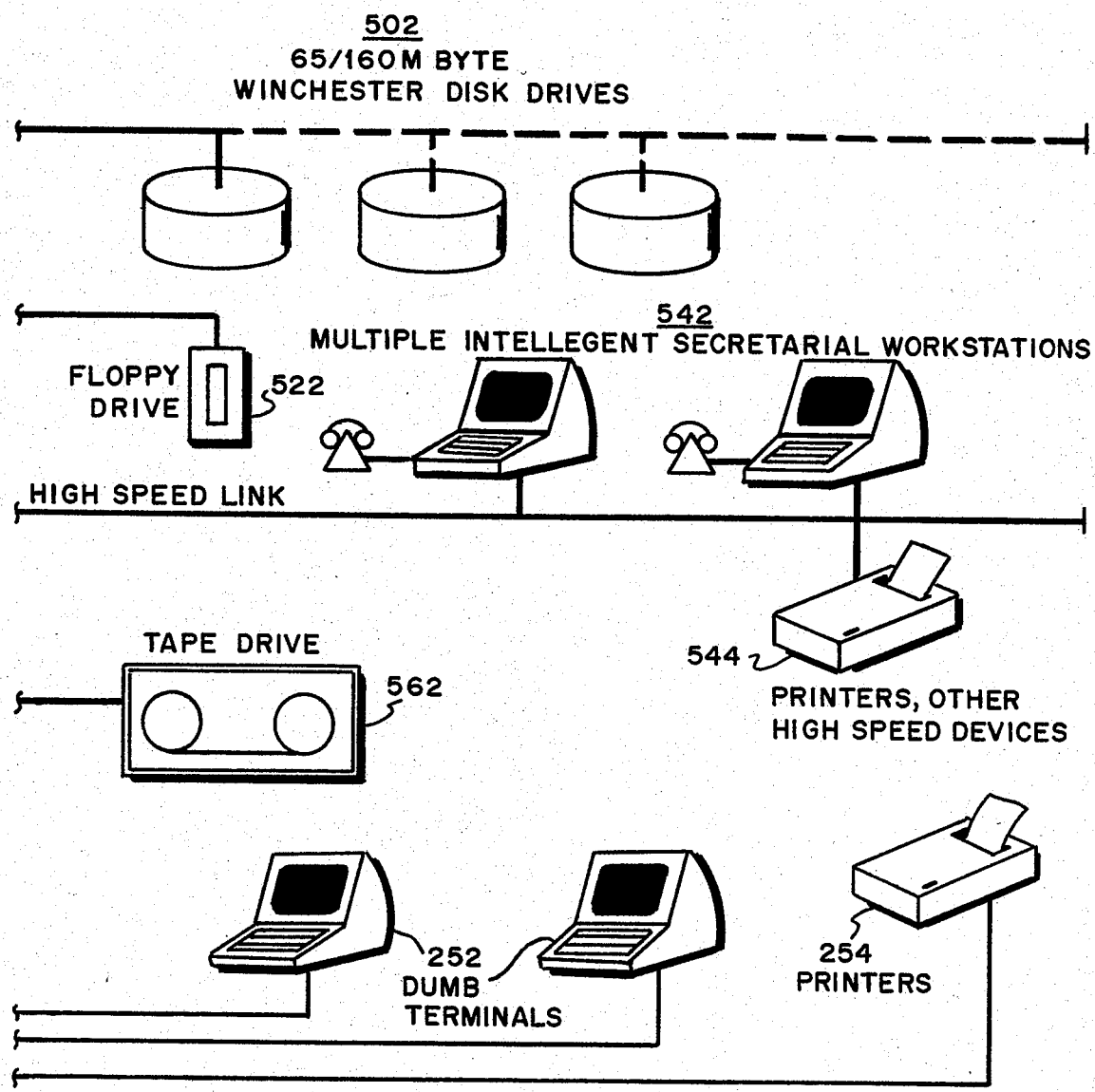
Figure 2A:
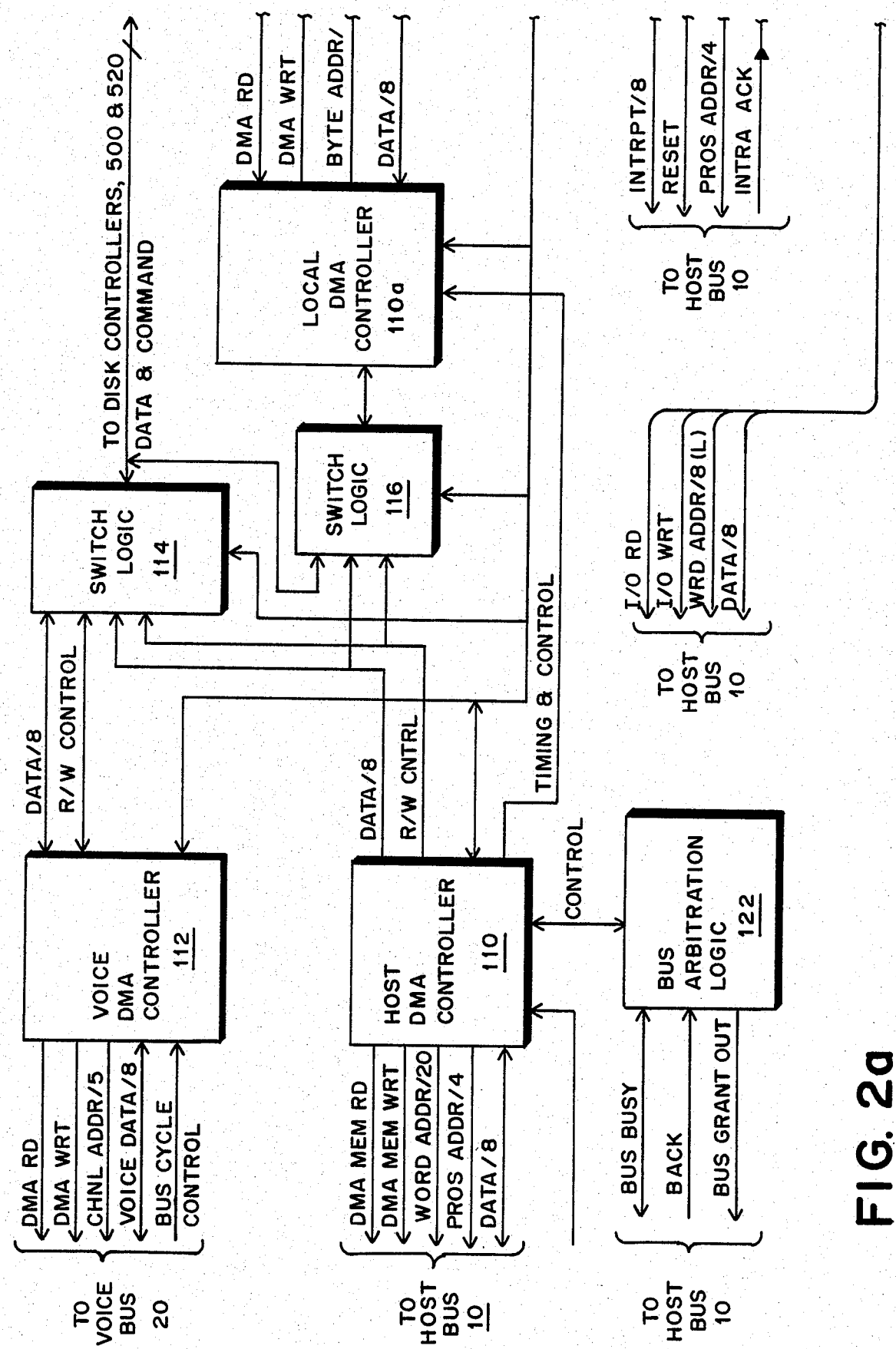
Figure 2B:
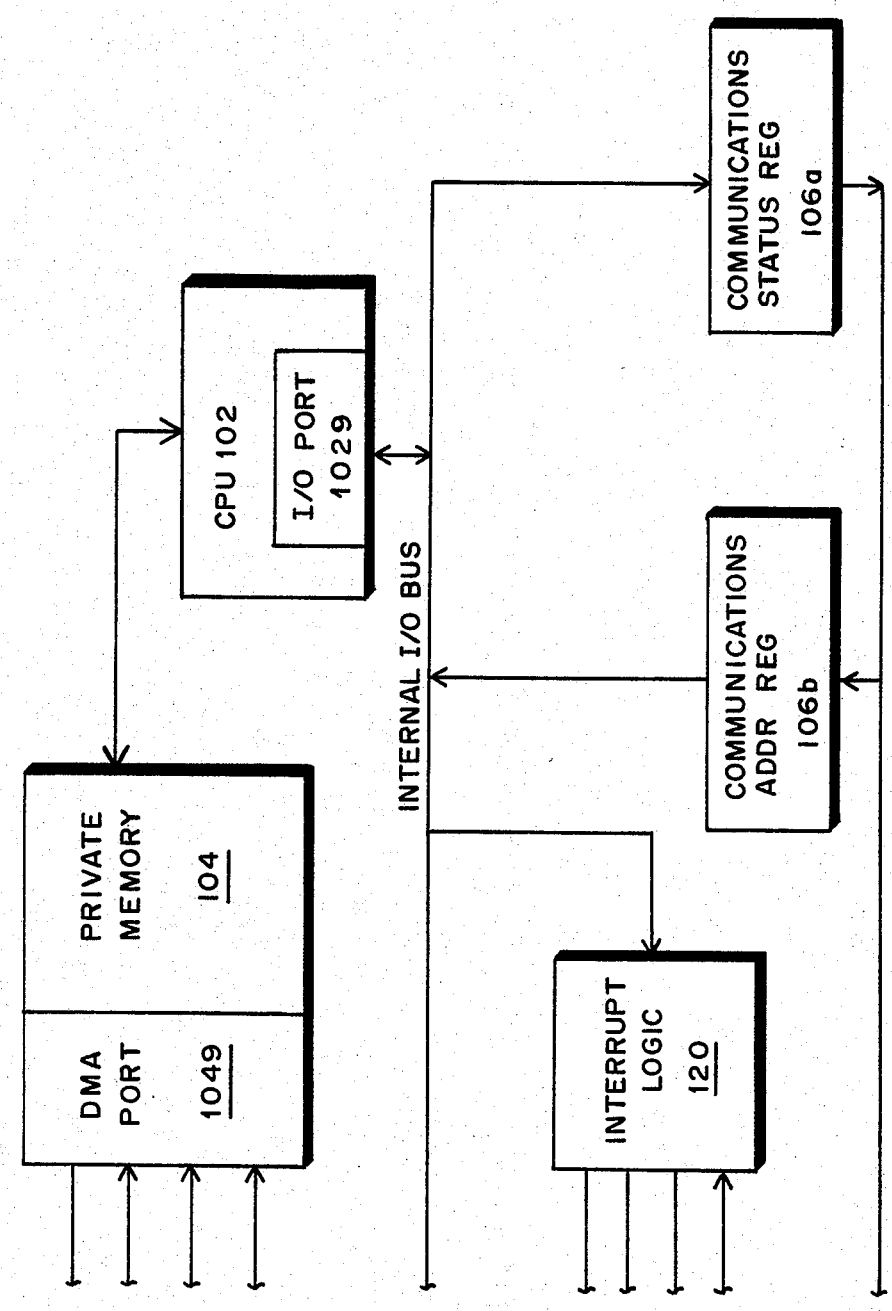

FIG. 2 shows a more detailed schematic block diagram of Storage/Network Processor 100 which comprises a central processing unit (CPU) 102, having an I/O Port 102a for communications with external devices. Operatively connected to CPU 102 is a Private Memory 104, including a direct memory access (DMA) port 104a, for storing data and program instructions for processing by CPU 102. Data may be transferred to and from memory 104 through local DMA controller 110a. (Because of the heavy processing load on Storage/Network Processor 100 a powerful microprocessor, such as a Motorola 68000 model microprocessor is preferred for use as CPU 102.)

Two registers, 106a and 106b are operatively connected to I/O port 102a and to the I/O read, I/O write, 8 low order word address lines and 8 data lines of the Host Bus for I/O communications between Storage/Network Processor and Host Processor 200, Communications Processor 250 and optional Auxiliary Host Processors 210, 220, etc., as will be described further below.

Storage/Network Processor 100 is operatively connected to Host Bus 10 for memory-to-memory transfer through Host DMA Controller 110. DMA Controller 110 is connected to the DMA memory read, DMA memory write, 20 word address lines, 4 processor lines, address lines, and 8 data lines of Host Bus 10. DMA controller 110 provides a data output to Switch Logics 114 and 116 which may route the data flow from DMA controller 110 either to conventional disk controllers (either Hard Disk Controller 500 or Floppy Disk Controller 520) or to Private Memory 104 through local DMA controller 110a, as will be more fully described below.

DMA controller 110 is operatively connected to I/O port 102a through the internal I/O Bus. Address boundaries and word counts are initialized in DMA controller 110 by I/O commands from CPU 102.

In the embodiment shown, timing and control circuitry for Host DMA 110 and Local DMA 110a are shaped and incorporated in host DMA 110 for design convenience.

Storage/Network Processor 100 is operatively connected to Voice Bus 20 through Voice DMA Controller 112. Voice DMA Controller 112 is connected to the DMA read, DMA write, 5 Channel Address lines, 8 Voice Data Lines and the Cycle Control Line of Voice Bus 20 to provide a data path for digitized voice data to Hard Disk Controller 500. Voice DMA Controller 12 provides an eight bit data path to switch logic 114 to provide a data path to Hard Disk Controller 500, as described further below.

Voice DMA Controller 112 is operatively connected to I/O port 102a through the internal I/O Bus. Address boundaries and word counts are initialized by I/O commands from CPU 102.

As described above Local DMA Controller 110a controls DMA port 104a. It is operatively connected to I/O port 102a through the Internal I/O Bus. Address boundaries and word counts are initialized for Local DMA 110a by I/O commands from CPU 102.

The above DMA Controllers are interconnected to each other and to disk controllers 500 and 520 by Switch Logics 114 and 116, each of which establishes one of two data paths. Logic 114 either establishes a data path between Voice DMA Controller 112 and hard Disk Controller 500 or it establishes a path between host DMA 110 and Disk Controllers 500 and 520. Thus, the Storage/Network Processor 100 allows either the transfer of digtial data between host computer private memories and the disks or the transfer of digitized voice data between Voice DMA 112 and the hard disk, under control of CPU 102, through switch logic 114. normally such transfers would consist of the transfer of voice and text data to the hard disk, though data transfers between the floppy disk and Host Processor 200's private memory, or the private memories of Auxiliary Host Processors 210, 221, etc. may be used, for example, for loading initial programs into these processors.

Switch Logic 116 either establishes a data path between Host DMA Controller 110 and Local DMA Controller 110a or establishes a path between Disk Controllers 500 and 520 and Local DMA Controller 110. The first path allows memory-to-memory communication between Storage/Network processor 100 and Host Processor 200 as described further below while the second would typically be used to initially load Private Memory 104 with the operating system for Storage/Network Processor 200.

Switch Logics 114 and 116 are both operatively connected to I/O port 102a through the Internal I/O Bus and data paths are established by I/O commands from CPU 102.

Though many methods for implementing Switching Logics 114 and 116 would be apparent to a person skilled in the art a preferred method makes use of tristate buffers coupled to busses to form the data paths. (Tri-state devices are digital circuits which, in addition to normal "0" and "1" output values in accordance with the digital input value, have a third state, entered in accordance with the state of an enable/disable input, where a high impedance is coupled into the output of the device, effectively removing the device from a circuit.) In the Storage/Network Processor of FIG. 2, 8 sets of buffers are used. Voice-Disk buffers carry signals from Voice DMA Controller 112 to Disk Controllers 500 and 520; Host-Disk buffers carry signals from Host DMA Controller 110 to Disk controller 500 and 520 and Local-Disk buffers carry signals from Local DMA Controller 110a to Disk Controllers 500 and 520. Disk-Voice, Disk-Host and Disk Local buffers carry the corresponding signals in the opposite direction. Finally, the Host-Local and Local-Host buffers carry signals between Host DMA Controller 110 and Local DMA Controller 110a.

Table 1 below shows the enable/disable (E/D) state of the drivers for various path conditions:

TABLE 1

|  | 1 | 2 | 3 |
|---|---|---|---|
| Voice-Disk | E | D | D |
| Host-Disk | D | E | D |
| Local-Disk | D | D | E |
| Disk-Voice | E | D | D |
| Disk-Host | D | E | D |
| Disk-Local | D | D | E |
| Host-Local | X | D | D |
| Local-Host | X | D | D |

Column 1 shows the conditions for establishing the Voice-Disk data path. Note that the Host-Local data path is independent of the Voice-Disk path and may be used simultaneously with the Voice-Disk path. Column two shows the Host-Disk path conditions and Column three shows the Local-Disk path conditions.

Those skilled in the art will recognize that the above switching scheme may readily be used with bi-directional lines by combining read/write signals with the switching state established by CPU 102 so that only buffers in one direction are enabled at any instant.

Bus arbitration logic 122 is operatively connected to and controlled by Host DMA Controller 110. When Host DMA 110 receives a Bus Request from Host Processor 100, or Auxiliary Host Processors 210, 220, etc., requesting that that processor be allowed to control Host Bus 10, if Host DMA Contoller does not wish to control Bus 10 it releases Bus Arbitration Logic 122. When Logic 122 sees that the bus is not busy it generates a Bus Grant Out signal which is used, as described further below, to determine priority between competing host processors. When one of the Host Processors 200, 210, 220, etc., or Communication Processor 250, which is requesting Host Bus 10, receives the Bus Grant Out signal it returns a Bus Acknowlege signal to Bus Arbitration Logic 122, which clears the Bus Grant Out signal in response.

Storage/Network Processor 100 also includes Interrupt Logic 120 which provides an interrupt on one of the 8 Interrupt lines of Host Bus 10, a reset signal and a 4 bit processor address to select one of Host Processors 200, 210, 220, etc. Interrupt Logic 120 is operatively connected to I/O port 102a through the Internal I/O Bux and Interrupt and reset signals are generated in response to I/O commands from CPU 102.

HOST AND COMMUNICATIONS PROCESSORS

FIG. 3 shows a more detailed schematic block diagram of Host Processor 200 (or of Auxillary Host Processors 210, 220, etc.) and of Communications Processor 250.

Host Processor 200 is based on any of several commercially available microprocessors 202. As noted above it is an advantage of the subject invention that the architecture is not processor dependent and will support any microprocessor as CPU so long as that processor supports a private random access memory (RAM) having a DMA port and an I/O port. Preferably the chosen microprocessor would have an interrupt capability.

Private memory 204 is directly accessable to CPU 202 in a conventional manner, which depends on the selection of microprocessor made, and includes DMA port 204a which is operatively connected to Host Bus 10.

The I/O port of CPU 202 is also connected to Host Bus 10, providing the capability for I/O transfers of 8 data bits on the data lines addressed in accordance with the low order 8 address bits; and, for Communications Processor 250, the I/O port of CPU 202 is also connected to Communication Ports and MUX 212, providing the capability for data transfers over a plurality of serial communications lines.

Bus arbitration logic 206 is operatively connected to CPU 202 to provide a means whereby CPU 202 may gain control of Host Bus 10. In response to a request from CPU 202 logic 206 will assert a Bus Request signal on the Host Bus 10. The Bus Request signnal is received by Host DMA Controller 110. If Controller 110 is not using, or when it is finished using, Host Bus 10 it signals bus arbitration logic 122 which in turn asserts Bus Grant Out. The Bus Grant signal line on Host Bus 10 is daisychained through the bus arbitration logic of each processor on Host Bus 10. When Bus Arbitration Logic 206 receives Bus Grant In, it returns a Bus Grant Acknowledge (BACK) signal. (If Logic 206 had not been requesting the bus it would have passed on the Bus Grant to the next device on its Bus Grant out line.) When Logic 206 then sees that the Bus Busy signal is not asserted, indicating the bus is free, it asserts Bus Busy, capturing the bus and signals CPU 202 that it may make an I/O transfer on Host Bus 10. When CPU 202 is finished it signals logic 206 which then removes Bus Busy, freeing the bus.

Interrupt/Reset Logic 208 responds to 8 levels of prioritized, addressed interrupt signals and an addressed reset signal generated by Storage/Network Processor Interrupt Logic 120 to interrupt or reset CPU 202. Interrupts are acknowledged on receipt by an Interrupt Acknowledge (INTER ACK) signal and Interrupt Logic 208 includes storage so that lower priority interrups may be held until they can be processed.

Communications Processor 250 is dedicated to handling low speed data communications, either from telephone interfacs 400 or terminals 252 and printers 254. It differs from Host Processor 200 only in the additional Communications Ports and Mulitplexer 212 comprising conventional asynchronous data ports, such as RS 232 ports, and a multiplexer interconnecting the data ports and the I/O port of CPU 202.

Those skilled in the art will recognize that the detailed design of the above described Host Processor 200, and other processors, is conventional and well within the ordinary skill, and that the design will vary depending on the particular microprocessor chosen.

STORAGE NETWORK/HOST MEMORY-TO-MEMORY DATA TRANSFERS (Unless otherwise noted references to Host Processor 200 also apply to Auxillary Processor 210, 220, etc. and Communications Processor 250.)

Figure 4:
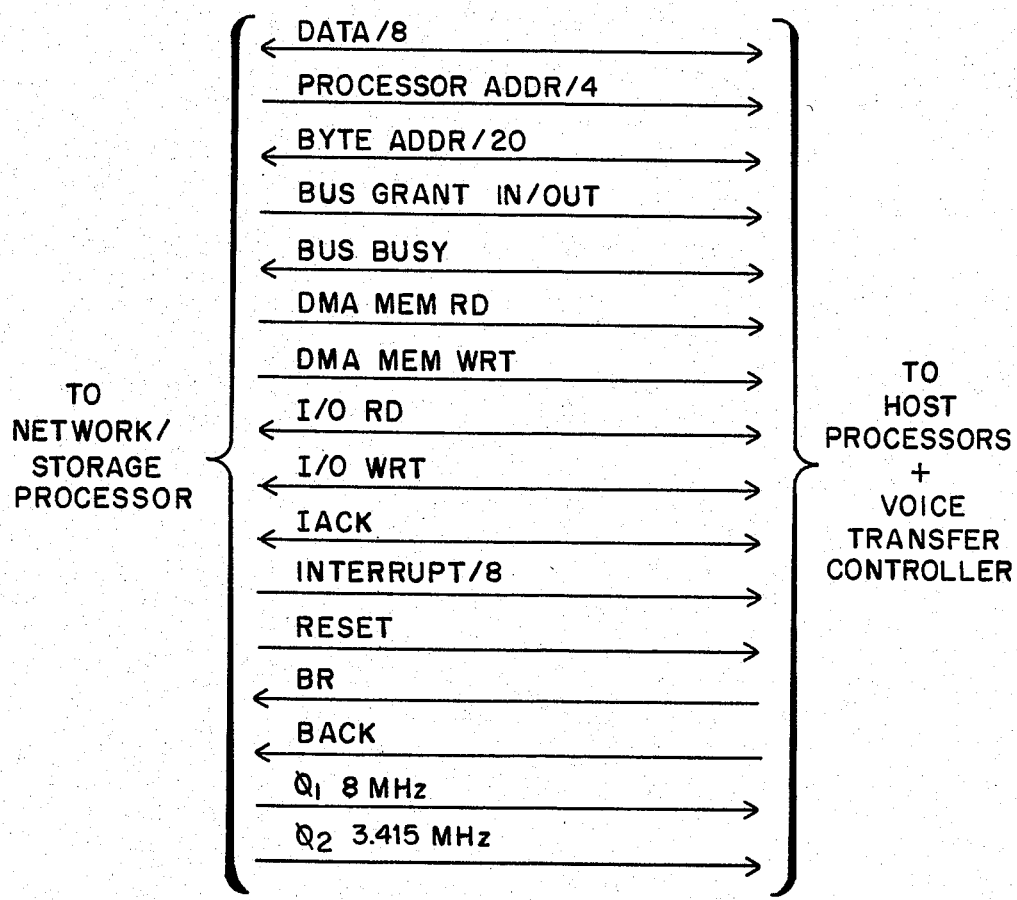
FIG. 4 is a diagram of the structure of the bus connecting the Storage/Network Processor the Host Processor and the Voice Transfer Controller.

FIG. 4 shows the details of Host Bus 10 used for memory to memory-to-memory transfer. Host Bus 10 comprises:

8 bi-directional data lines, for the transfer of data.

4 processor address lines, which are asserted by Storage/Network Processor 100 to identify the addressed Host Processor.

20 byte address lines, the low order 8 of which are bi-directional and may be used by the Host Processor 200 for I/O transfers and the high order 12 of which are asserted only by Storage/Network Processor 100, in conjunction with the low order 8, to define the byte address.

A bus grant in/out line, which, in contrast to the other lines, is not connected in parallel but is connected sequentially to the bus arbitration logic of each processor operatively connected to Host Bus 10. A bus grant out signal is generated by the bus arbitration logic of a processor, and becomes the bus grant in of the next processor on the bus, when a bus grant in signal is received from the preceding processor and the receiving processor is not requesting the bus. (The initial bus grant out signal is generated by Bus Arbitration Logic 122 in response to a bus request signal generated by a processor which wants control of the bus.)

A bi-directional bus busy signal which is asserted by any device which is using the bus. A DMA memory read strobe, which is asserted by Storage/Network Processor 100 when a byte is read from a Private Memory 204.

A DMA memory write strobe, which is asserted by Storage/Network Processor 100 when writing a byte to a Private Memory 204.

An I/O read strobe which is asserted by Host processor 200 when it wishes to read a byte in through I/O Port 200-1.

An I/O write strobe which is asserted by Host Processor 200 when it wishes to write a byte through I/O Port 200-1.

8 priority interrupt lines which may be asserted by Storage/Network Processor 100 to interrupt Host Processor 200.

An interrupt acknowledge line which is asserted by Host Processor 200 to acknowledge receipt of an interrupt.

An addressed reset line which is asserted to reset selected processors.

A bus request line which may be asserted by any processor to request control of Host Bus 10.

A bus acknowlege signal which is asserted by any processor to acknowledge receipt of bus control.

Two clocks which are used as system clocks and distributed on the bus as a matter of design convenience. (note that transactions on Host Bus 10 are asynchronous.)

For a data transfer from the Storage/Network processor 100 to Host Processor 200 Storage/Network CPU 102 sets up the data to be transferred as a block in Private Memory 104 and initializes Host DMA Controller 110, Switch Logic 116 and Local DMA Controller 110a for a Storage/Network to Host data transfer. Host DMA Controller 110, which has the highest priority for Host Bus 10, then takes control of Host Bus 10 and transfers the data into a preselected region of Private Memory 204. Host DMA Controller 110 then transfers a second block data, also set up by CPU 102, to a particular region of Private Memory 204; the second block containing the necessary information defining the location, size and format of the first block.

When the transfer is finished, Controller 110 signals CPU 102 which in turn signals Interrupt Logic 120 to address Host Processor 200 on the 4 processor address lines on Host Bus 10 and assert one of the 8 levels of interrupt. In response to the interrupt Host Processor 200 will access and process the data in the first block in accordance with the information in the second block stored in the particular region of Memory 204.

For a data transfer from Host Processor 200 to Storage/Network processor 100, Host CPU 202 sets up the data to be transferred as a block in Host Private Memory 204 and sets up a second block of data containing the necessary locational, length and formatting information for the first block in a particular region of Memory 104. CPU 202 then signals Bus Arbitration Logic 206 to request control of the Host Bus 10 as described above. When it gains control of Host Bus 10 CPU 202 executes an I/O read operation to Storage/Network Communications Status Register 106a to determine if Communications Address Register 106b is clear. If Register 106b is clear logic associated with Register 106a sets that register to show Register 106b busy so that no other processor may access Register 106a and Host Processor 200 writes its address into Register 106b and releases Host Bus 10. (If Host Processor 200 finds Register 106b busy it releases the bus to avoid locking up the system and then retries.

Periodically, under its own control program, Storage/Network Processor 100, reads Register 106b and sets Communications Register 106a to clear status. It then sets up a data path from Host Processor 200 to Private Memory 104 exactly, except for the direction of data flow, as described above and Host DMA Controller 110 transfers the data block stored in a particular region of Memory 204 and containing the location, size and format information to Private Memory 104. CPU 102 uses this information to reinitialize Host DMA controller 110 and transfer the data block to Memory 104 for processing.

In response to such a memory to memory data transfer Storage/Network Processor 100 may establish a Host-Disk data path as described above and set up Host DMA Controller 110 to transfer a block of data, described in the message from Private Memory 204, to Disks 500. Conversely, Storage/Network Processor 100 may establish a Disk-Host data path, set up Host DMA Controller 110 and transfer a block of Data from Disk 500 to Host Private Memory 204. Storagte/Network Processor may then initiate a memory to memory transfer to Host Processor 200 to signal that such a transfer has been made and to provide other information needed by Host Processor 200 to process the data transferred.

Communications between Host Processor 200 and, for example, Communications Processor 250 are carried out by transmitting a message to Storage/Network processor 100 for retransmission to a designated recipient on Host Bus 10.

Other bus structures are also within the contemplation of the subject invention. Thus, in another embodiment of the subject invention Host Bus 10 may not include address lines and data may be transferred between the various processors in the form of addressed data packets using techniques similar to those used for interprocessor communications in Local Area Networks. Such a bus structure would be advantageous in that it would simplify connection of the system of the present invention to a Local Area Network.

VOICE BUS AND ASSOCIATED SUBSYSTEMS

Figure 5:
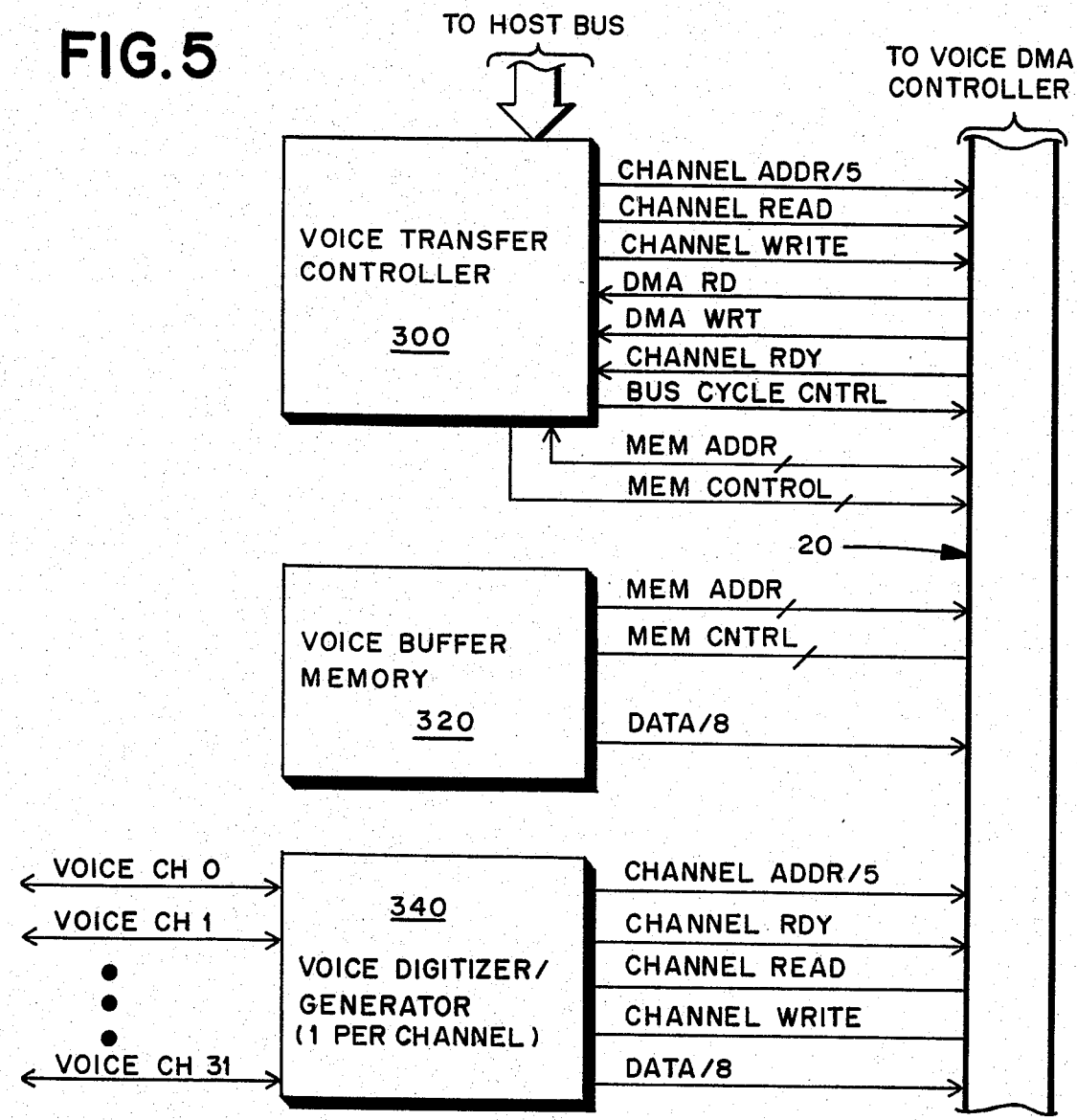
FIG. 5 is a schematic block digram showing the structure of the bus connecting the Voice Transfer Controller, the Voice Buffer Memory and the Voice Digitizer Generator.
Figure 6:
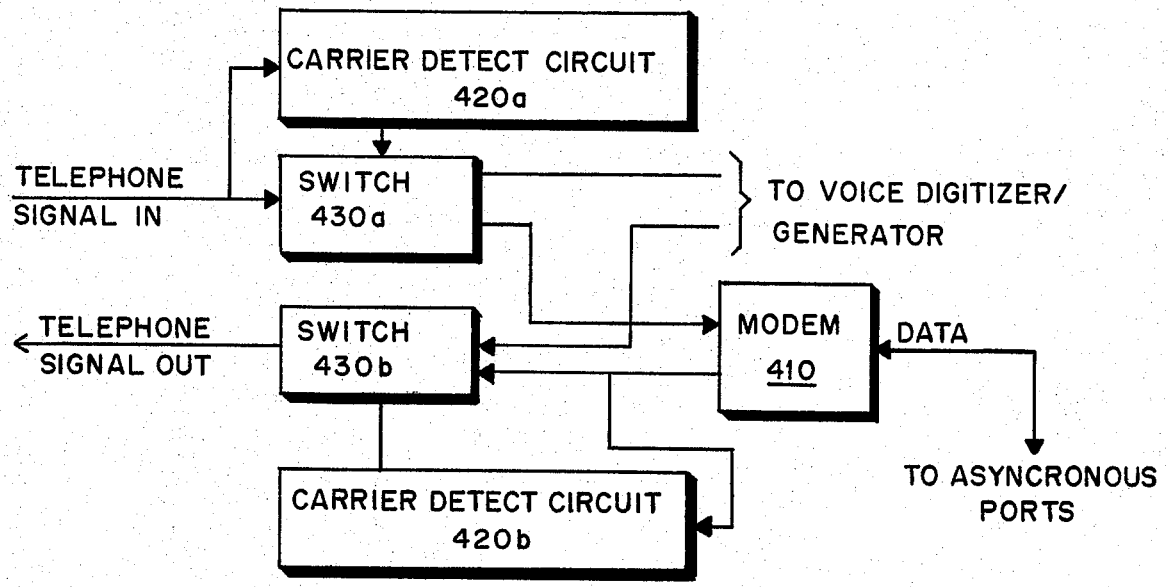
FIG. 6 is a more detailed schematic block diagram of a typical Telephone Interface.

FIG. 5 shows a more detailed schematic block diagram of Voice Bus 20 and its associated subsystems. Up to 32 channels of voice signals can be coupled to Voice Bus 20 through Telephone Interfaces 400, and Voice Digitizers/Generators 340. Separate Telephone Interfaces 400 are provided for each telephone line connected to the system as shown in FIG. 6. Each Interface 400, as shown in FIG. 6, is primarily made up of a conventional Modem 410 which interfaces the telephone lines to the asynchronous ports of Communications Controller 250, conventional Carrier Detection Circuitry 420a and a switch 430a, controlled by Circuitry 420a which connects the telephone signal input to Digitizers/Generators 340 in the absence of a data carrier for voice transmission onto Voice Bus 20, and to modem 410 when a data carrier is present for transmission of digital data to Communications Controller 150. Circuit 420b and Switch 430b function in substantially the same way to control voice and data output to the telephone lines. (Note that Interfaces 400 may operate full duplex.) Interfaces 400 may also include conventional circuitry for recognition and translation of "Touch-Tone" type signals generated by pushbutton type telephones. ("Touch-tone" is a Trademark of the Bell System for a technique wherein each button on a push button phone transmits a unique identifying tone over the phone lines when pressed). The digital data transmitted to Controller 250 may be stored in the system in a conventional manner but also may serve to identify to the system that a channel is available for receipt or transmission of a voice message.

Figure 7:
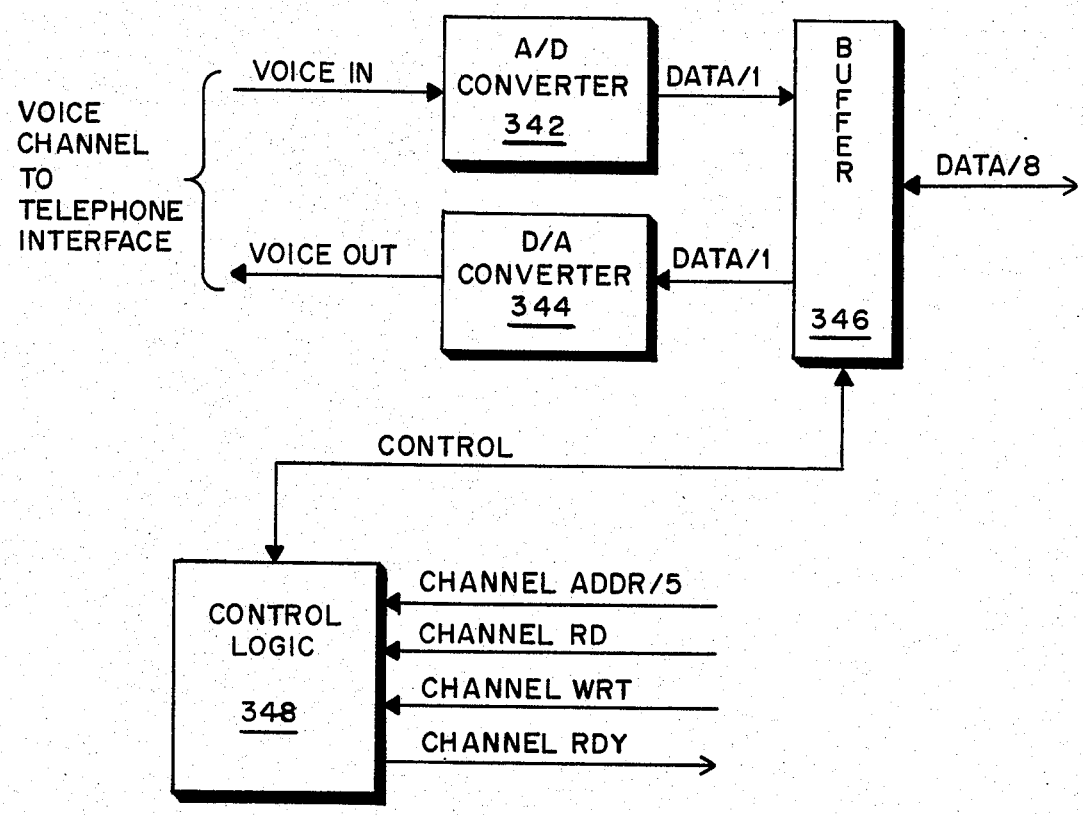
FIG. 7 is a more detailed schematic block digram of a typical Voice Digitizer/Generator.

Voice Digitizers/Generators 340 comprise separate digitizers/generators as shown in FIG. 7 for each of Interfaces 400 and its associated telephone line. Each digitizer/generator comprises a conventional incremental tracking analog to digital (A/D) converter 342 and a conventional incremental tracking digital to analog (D/A) converter 344. (By "incremental tracking" herein is meant an A/D or D/A converter which outputs or inputs, respectively, a series of digital signals representing binary numbers, of a predetermined length, proportional to the an incremental increase or the incremental decrease in the corresponding analog signal.)

The A/D and D/A Converters 342 and 344 output and input digital data to and from Buffer 346, respectively, depending on the direction of signal flow. The direction of data flow is established in each digitizer/generator by Control Logic 348 in accordance with the channel select and channel Read and Write signals. Buffer 346 acts as a serial-to-parallel or parallel-to-serial converter to transfer digital data to or from Voice Bus 20 in accordance with the direction of signal flow. Control Logic 348 strobes data to or from Buffer 346 in accordance with the channel select signal and then serially shifts data from A/D Converter 342 or to D/A Converter at approximately a 24–32 kilobit/sec rate.

Preferably, A/D Converter 342 will include conventional automatic gain control circuitry to normalize the analog voice signal received from the telephone lines.

Data is transferred from Buffer 346 over Voice Bus 20 to Voice Buffer Memory 320 under control Voice Transfer Controller 300 described more fully below. Memory 320 is conventional RAM and organized to form a double buffer for each voice channel. The buffers in Memory 320 are programmable by Host Processor 200 and typically are each approximately 14 kilobytes long to provide approximately 3.3 seconds of storage for a voice signal. (By "double buffering" herein is meant that each channel is provided with two buffers, one of which may be emptied while the other is being filled and which then switch roles.) Controller 300 maintains the status of all buffers and the current addresses to used for the next byte to be transferred to or from Memory 320 and maintains the current byte count. Controller 300 also maintains a current address pointer which may be read by Host 200, for each buffer.

Voice Transfer Controller 300 is also operatively connected to Voice DMA Controller to transfer data between buffers in Voice Buffer Memory 320 and Disk Drives 502 through Storage network Processor 100 and hard Disk Controller 500. To transfer data to Disk Drives 502 Voice Transfer Controller time shares Voice Bus 20 on a byte by byte basis between Voice DMA Controller 112 and Voice Digitizers/Generators 340. The Bus Cycle Control signal is asserted by Voice Transfer Controller 300 for one half of each bus cycle and during that half cycle Controller 300 accesses the appropriate memory location in Memory 320 to transfer data between DMA Controller 112 and the next available location in the buffer for the channel defined by Voice Transfer Controller 300 on the 5 Channel Address Lines. During the other half cycle Voice Transfer Controller 300 sequentially selects and transfers data between Buffers 346 of Voice Digitizers/Generators 340 and Buffer Memory 320 for channels that are active.

Turning to FIG. 8, a more detailed schematic block diagram of Voice Transfer Controller 300 is shown. Controller 300 comprises high speed Scratchpad Memory 302 which stores data defining the status of each channel buffer established in Buffer Memory 320. Each such buffer is defined by a quadruplet of data words as shown in FIG. 8a; one word defining the starting address of the associated buffer, the next sequential work defining the starting word count of the associated buffer and the next two locations defining the current address to be addressed and current word count in the buffer. In normal operation the starting address and count will remain fixed, however if necessary, buffer allocation may be dynamically altered under control of a host processor as will be described below.

Scratchpad Memory 302 operates under control of Control Logic 304. Control Logic 304 synchronizes a high speed DMA block data transfer to or from Disk Drives 502 through Voice Controller 112 and uses the buffer data stored in Scratchpad 302 to control a low speed transfer of data words between each active Digitizer/Generator Buffer 346 and its associated buffer in Buffer Memory 320. Voice Bus 20 is multiplexed between these modes on a word by word basis under control of the Bus Cycle Control signal generated by Voice Transfer Controller 300 and received through DMA Port 3043. For one half of the bus cycle the 8 Voice Data lines on Voice Bus 20 are used to transfer a data word between voice DMA Controller 112 and Buffer Memory 230. During the other half of the Bus Cycle control Logic 304 cycles sequentially though the active channels transferring data words between Digitizer/Generator Buffers 346 and their associated buffers in Memory 320.

Those skilled in the art will recognize that typical hard disk transfer rates of approximately 8 Megabits per second, require that Scratchpad 302 have an access time on the order of 10's of nano seconds in order to successfully sequence the active channels and multiplex Voice Bus 20. A suitable high-speed memory would be a Model 93422 manufactured by Fairchild Camera and Instrument Corporation of Mountain View, CA.

When a buffer in memory is either full (or empty) or half full (or empty) Logic 304 activates Interrupt Logic 306 to generate an interrupt over Host Bus 10, in a manner substantially similar to the interrupt process described above for Storage/Network processor 100, to Host Processor 200 (or other Auxillary Host Processors, 210, 220, etc.). Logic 304 then loads information identifying the full half buffer into an I/O buffer in I/O Port 3045 and Host Processor 200 performs an I/O Read Operation through I/O Port 3045 to identify the full (or empty) half buffer which must be emptied to (or filled) from disk drive 502. Host 200 then communicates with Storage/Network Processor 100 as described above to inform Processor 100 that data must be transferred between a buffer in Memory 320 and Disk Drive 502. Processor 100 than initializes Hard Disk Controller 500 and Voice DMA Controller 112. Controller 112 then puts the appropriate memory address and a DMA Read or Write signal as appropriate on Voice Bus 20 to DMA Port 3043 to initiate a block transfer from or/to Disk Drive 502 to fill or empty the half buffer. During the DMA half of each bus cycle, as indicated by the Bus Cycle Control signal, Voice DMA Controller 112 transfers a byte of digitized voice data from the selected buffer in Buffer Memory 320. The current address register is then incremented and the current count is decremented and the cycle repeated during each successive DMA half-cycle on Voice Bus 20 until the entire data block has been transferred between Disk Drive 502 and the appropriate half-buffer.

During some of the channel half-cycles of Voice Bus Control Logic 304 sequentially and cyclically services each active channel, transferring data words between the Digitizer/Generator Buffers 346 and the current address of the associated buffer in Buffer Memory 320. During each channel half-cycle of Voice Bus 20, Control Logic 304 transfers the current address and current count information for the buffer in Buffer Memory 320 into Buffer Address Registers 3044 and puts the address on Voice Bus 20 through Buffer Port 3049. Then in response to a channel Ready, which indicates data availability in Buffer 346, Signal Logic 304 asserts a Channel Read or Channel Write signal as appropriate while simultaneously accessing Buffer Buffer Memory 320 through Buffer Port 3047 to transfer voice data over Voice Bus 20 between Memory 320 and the appropriate Buffer 346. The current address is then incremented and the count decremented and the information is restored in Scratchpad 302. On successive channel half-cycles successive active channels are serviced, and, as described above as each half-buffer is filled logic 304 initiates an interrupt of Host Processor 200, or other appropriate processor, through Interrupt Logic 306.

Control Logic 304 also, in the present embodiment, uses every fourth channel half-cycle for memory refresh for Buffer Memory 320.

Control Logic 304 is also connected to host Bus 10 through I/O Port 3045 so that Host Processor 200, or other appropriate processor, may perform I/O operations to Logic 304 in a manner substantially similar to that described for I/O operations between Host Processor 200 and Storage/network processor 100. I/O Write operations may be used by Host Processor 200 to establish and reallocate buffer areas in Memory 320 and to activate or inactivate various channels. I/O Read operations, in addition to being used by Host Processor 200 in response to an interrupt to determine which channel buffer requires service, also may be used to read the current location pointers for each channel stored in Buffer Memory 320.

Host Processor 200 may use its capability for I/O access to Voice Transfer Controller 300 to not only control transfers of digitized voice data between Disks 500 and Buffer Memory 320 but may also control Voice Transfer Controller 300 to transfer selected blocks of pre-stored digitized voice data from Buffer Memory to Digitizer/Generators 340. This allows Host 200 to concatenate various voice prompting messages for transmission over the telephone lines. As an example, Host 200 could prompt a user when connection was first established through interfaces 400.

Preferably each channel buffer in Buffer Memory 320 comprises two approximately 14 kilo byte half-buffers and the voice signal is digitized at approximately 4 kilo byte/sec rate, so that each half-buffer provides approximately 3.3 seconds of storage. Also, preferably up to 32 channels are provided and Disk Drive 502 is a conventional Winchester type disk having approximately a 8 mega bits/sec transfer rate so that the total time to access 32 half-buffers is approximately 128 milliseconds per 3.3 seconds and the disk is used for voice transfers less than 0.3 percent of the time.

VOICE STORAGE AND RETRIEVAL OPERATION

In operation a user would establish contact with one of Telephone Interfaces 400 over telephone lines, either local or dial-up. Typically the user would first send data to the system providing identifying information and/or defining a request. (Alternatively it is within the contemplation of the subject invention that the system detect and respond to circuit completion and first transmit, either a digital or voice signal, typically to provide instruction for a user.) Communications Processor 250 would receive the data from the contacted Telephone Interface 400 and would transmit it to Host Processor 200 over Host Bus 10, as described above in the section entitled Storage/Network Memory-to-Memory Data Transfers. Host Processor 200 would issue instructions to Storage/Network Processor 100, again as Memory-to-Memory Data Transfer, to establish an appropriate storage region on Disk 502. Processor 200 would then issue an I/O Write to Voice Transfer Controller to turn on the appropriate channel in the appropriate direction as defined by the data sent by the user. (While hereinafter, for ease of description, transmission from the user for recording will be described, those skilled in the art wil readily recognize the minor changes needed to play back recorded voice signals.) Host Processor 200 may then release Voice Transfer Controller 300 and is free to perform other processing tasks. When Controller 300 senses that an associated half-buffer in Memory 320 is full it generates an interrupt on Host Bus 10 addressed to Processor 200. Processor 200 then performs on I/O Read operation from controller 300 to determine which channel require service. Processor 200 then instructs Storage/Network Processor 100 to service the interrupting channel. CPU 102 in Storage/Network Processor 100 then initializes Disk Controller 500, sets up Switch Logic 114 to transfer data from Voice DMA Controller 112 to Disk Controller 500, and initializes a block data transfer from the channel requesting service through DMA Controller 112.

Such a block transfer would require less than 4 milliseconds at the disk rate of 8 megabits per sec. and those skilled in the art will recognize that multiple channels of voice and data may be multiplexed to Disk Drive 502 without over loading the drive.

It is particularly within the contemplation of the subject invention to interfere voice and text messages and associate such voice messages with particular points in such text messages so that such voice messages may be played back in association with such points.

The embodiments described above and shown in the attached drawings have been described for purposes of illustration only and those skilled in the art will recognize many other possible embodiments within the contemplation of the subject invention. Thus limitations on the scope of the subject invention are to be found only in the claims set forth below.

What is claimed is:

1. A voice/text storage and retrieval apparatus comprising:
   (a) digital mass storage means for storage and retrieval of digital data and of digitized voice signal data;
   (b) first processor means for controlling access to said digital mass storage means;
   (c) host processor means for monitoring, coordination and supervision of the operation of said apparatus;
   (d) communications processor means for reception and retransmission of digital data;
   (e) interface means for receiving and transmitting both digital data signals and analog voice signals, said interface means further comprising detection means for the detection of digital data signals and switch means responsive to said detection means for separating said digital data signals from said analog voice signals, said switch means operatively connecting said communications processor means to said interface means for transmission and reception of said digital signals;
   (f) conversion means operatively connected to said interface switch means for the reception and transmission of said analog voice signals, said received analog voice signals being digitized by said conversion means and said transmitted analog voice signal being generated by said conversion means in response to a digital input;
   (g) buffer means for buffering the flow of data to and from said conversion means;
   (h) voice transfer control means for controlling the transfer of data between said buffer means and said conversion means for signaling said host processor when a block of said digitized voice signal data must be transferred between said bufer and said mass storage means and in response to signals from said first processor means controlling such block transfers;
   (i) a first bus operatively interconnecting said first processor means, said communications processor means and said host processor means, whereby digital data received by, or to be transmitted by said communications processor may be transferred between said mass storage means and said communications processor means under control of said first processor means and in response to commands from said host processor means;
   (j) a second bus operatively interconnecting said first processor means, said voice transfer control means, said buffer means and said conversion means, whereby said digitized voice data may be transferred between said buffer means and said conversion means and blocks of said digitized voice data may be transferred between said mass storage means and said buffer means under control of said first processor means and said voice transfer control means; and
   (k) said first bus being further operatively connected to said voice transfer control means whereby said host processor means may initiate or halt digitized voice data signal transfers to and from said conversion means.

2. A voice/text storage and retrieval apparatus as described in claim 1 wherein said interface means further comprises a plurality of interface units each operatively connected to an associated telephone line to receive and transmit both digital data signals and analog voice signals over said telephone lines.

3. A voice/text storage and retrieval apparatus as described in claim 2 wherein said switch means further comprises a plurality of switch units each operatively associated with an interface unit and said conversion means further comprises a plurality of conversion units each operatively connected to one of said switch units for the reception and transmission of analog voice signals over its associated telephone line.

4. A voice/text storage and retrieval apparatus as described in claim 3 wherein said conversion units further comprise input/out buffers operatively connected to said second bus for the receipt and transmission of digital representations of said analog voice signals to and from said buffer means.

5. A voice/text storage and retrieval apparatus as described in claim 4 wherein said voice transfer control means sequentially and cyclically performs input/output operations between said buffer means and said conversion unit input/output buffers.

6. A voice/text storage and retrieval apparatus as described in claim 5 wherein said voice transfer control means generates a bus cycle control signal to divide each cycle of access to said control bus into two portions, one of said portions being available for said input/output operations between said buffer means and said conversion unit input/output buffers and the other of said portions being available for transmission of a word of said block transfers of digitized voice signals to said mass storage means.

7. A voice/text storage and retrieval apparatus as described in claim 3 wherein said conversion units further comprise incremental tracking analog-to-digital and digital-to-analog converters for converting and generating said analog voice signals.

8. A voice/text storage and retrieval apparatus as described in claim 4 wherein said conversion units further comprise incremental tracking analog-to-digital and digital-to-analog converters for concerting and generating said analog voice signals.

9. A voice/text storage and retrieval apparatus as described in claim 5 wherein said conversion units further comprise incremental tracking analog-to-digital and digital-to-analog converters for converting and generating said analog voice signals.

10. A voice/text storage and retrieval apparatus as described in claim 6 wherein said conversion units further comprise incremental tracking analog-to-digital and digital-to-analog converters for converting and generating said analog voice signals.

11. A voice/text storage and retrieval apparatus as described in claim 2 wherein said buffer means comprises a random access memory operatively connected to and controlled by said voice transfer control means and operatively connected to said second bus for the transfer of digital representations of said analog voice signal, said voice transfer control means selecting particular areas of said memory as buffer areas for data to be received from or to be transmitted through an associated one of said telephone interfaces.

12. A voice/text storage and retrieval apparatus as described in claim 11 wherein said host processor means may access said voice transfer control means to initiate transfer of selected segments of pre-stored voice data from said buffer means to said conversion means whereby said host processor means may concatenate said segments to form preselected voice messages for transmission as analog signals over said associated telephone lines.

13. A voice/text storage and retrieval apparatus as described in claim 12 wherein said host processor means accesses said voice transfer control means in response to a signal received over a particular one of said telephone lines and a preselected voice message is transmitted over said particular line.

14. A voice/text storage and retrieval apparatus as described in claim 3 wherein said buffer means comprises a random access memory operatively connected to and controlled by said voice transfer control means and operatively connected to said second bus for the transfer of digital representations of said analog voice signal, said voice transfer control means selecting particular areas of said memory as buffer areas for data to be received from or to be transmitted through an associated one of said telephone interfaces.

15. A voice/text storage and retrieval apparatus as described in claim 4 wherein said buffer means comprises a random access memory operatively connected to and controlled by said voice transfer control means and operatively connected to said second bus for the transfer of digital representations of said analog voice signal, said voice transfer control means selecting particular areas of said memory as buffer areas for data to be received from or to be transmitted through an associated one of said telephone interfaces.

16. A voice/text storage and retrieval apparatus as described in claim 5 wherein said buffer means comprises a random access memory operatively connected to and controlled by said voice transfer control means and operatively connected to said second bus for the transfer of digital representations of said analog voice signal, said voice transfer control means selecting particular areas of said memory as buffer areas for data to be received from or to be transmitted through an associated one of said telephone interfaces.

17. A voice/text storage and retrieval apparatus as described in claim 6 wherein said buffer means comprises a random access memory operatively connected to and controlled by said voice transfer control means and operatively connected to said second bus for the transfer of digital representations of said analog voice signal, said voice transfer control means selecting particular areas of said memory as buffer areas for data to be received from or to be transmitted through an associated one of said telephone interfaces.

18. A voice/text storage and retrieval apparatus as described in claim 7 wherein said buffer means comprises a random access memory operatively connected to and controlled by said voice transfer control means and operatively connected to said second bus for the transfer of digital representations of said analog voice signal, said voice transfer control means selecting particular areas of said memory as buffer areas for data to be received from or to be transmitted through an associated one of said telephone interfaces.

19. A voice/text storage and retrieval apparatus as described in claim 8 wherein said buffer means comprises a random access memory operatively connected to and controlled by said voice transfer control means and operatively connected to said second bus for the transfer of digital representations of said analog voice signal, said voice transfer control means selecting particular areas of said memory as buffer areas for data to be received from or to be transmitted through an associated one of said telephone interfaces.

20. A voice/text storage and retrieval apparatus as described in claim 9 wherein said buffer means comprises a random access memory operatively connected to and controlled by said voice transfer control means and operatively connected to said second bus for the transfer of digital representations of said analog voice signal, said voice transfer control means selecting particular areas of said memory as buffer areas for data to be received from or to be transmitted through an associated one of said telephone interfaces.

21. A voice/text storage and retrieval apparatus as described in claim 10 wherein said buffer means comprises a random access memory operatively connected to and controlled by said voice transfer control means and operatively connected to said second bus for the transfer of digital representations of said analog voice signal, said voice transfer control means selecting particular areas of said memory as buffer areas for data to be received from or to be transmitted through an associated one of said telephone interfaces.

22. A voice/transfer storage and retrieval apparatus as described in claim 11 wherein said voice transfer control means further comprises a scratchpad memory, said scratchpad memory containing information defining the location, extent and current status of each of said buffer areas, said voice transfer control means accessing said information to determine the appropriate location in said random access memory for each input/output operation with said conversion unit input/output buffers, and said voice transfer control means still further comprising interrupting means for generating a signal each time one of a plurality of preselected portions of said buffer areas is filled and block transfer means responsive to signals from said first processor means for block transferring the information in said full portion to said digital mass storage means under control of said first processor means.

23. A voice/transfer storage and retrieval apparatus as described in claim 14 wherein said voice transfer control means further comprises a scratchpad memory, said scratchpad memory containing information defining the location, extent and current status of each of said buffer areas, said voice transfer control means accessing said information to determine the appropriate location in said random access memory for each input/output operation with said conversion unit input/output buffers, and said voice transfer control means still further comprising interrupting means for generating a signal each time one of a plurality of preselected portions of said buffer areas is filled and block transfer means responsive to signals from said first processor means for block transferring the information in said full portion to said digital mass storage means under control of said first processor means.

24. A voice/transfer storage and retrieval apparatus as described in claim 15 wherein said voice transfer control means further comprises a scratchpad memory, said scratchpad memory containing information defining the location, extent and current status of each of said buffer areas, said voice transfer control means accessing said information to determine the appropriate location in said random access memory for each input/output operation with said conversion unit input/output buffers, and said voice transfer control means still further comprising interrupting means for generating a signal each time one of a plurality of preselected portions of said buffer areas is filled and block transfer means responsive to signals from said first processor means for block transferring the information in said full portion to said digital mass storage means under control of said first processor means.

25. A voice/transfer storage and retrieval apparatus as described in claim 16 wherein said voice transfer control means further comprises a scratchpad memory, said scratchpad memory containing information defining the location, extent and current status of each of said buffer areas, said voice transfer control means accessing said information to determine the appropriate location in said random access memory for each input/output operation with said conversion unit input/output buffers, and said voice transfer control means still further comprising interrupting means for generating a signal each time one of a plurality of preselected portions of said buffer areas is filled and block transfer means responsive to signals from said first processor means for block transferring the information in said full portion to said digital mass storage means under control of said first processor means.

26. A voice/transfer storage and retrieval apparatus as described in claim 17 wherein said voice transfer control means further comprises a scratchpad memory, said scratchpad memory containing information defining the location, extent and current status of each of said buffer areas, said voice transfer control means accessing said information to determine the appropriate location in said random access memory for each input/output operation with said conversion unit input/output buffers, and said voice transfer control means still further comprising interrupting means for generating a signal each time one of a plurality of preselected portions of said buffer areas is filled and block transfer means responsive to signals from said first processor means for block transferring the information in said full portion to said digital mass storage means under control of said first processor means.

27. A voice/transfer storage and retrieval apparatus as described in claim 18 wherein said voice transfer control means further comprises a scratchpad memory, said scratchpad memory containing information defining the location, extent and current status of each of said buffer areas, said voice transfer control means accessing said information to determine the appropriate location in said random access memory for each input/output operation with said conversion unit input/output buffers, and said voice transfer control means still further comprising interrupting means for generating a signal each time one of a plurality of preselected portions of said buffer areas is filled and block transfer means responsive to signals from said first processor means for block transferring the information in said full portion to said digital mass storage means under control of said first processor means.

28. A voice/transfer storage and retrieval apparatus as described in claim 19 wherein said voice transfer control means further comprises a scratchpad memory, said scratchpad memory containing information defining the location, extent and current status of each of said buffer areas, said voice transfer control means accessing said information to determine the appropriate location in said random access memory for each input/output operation with said conversion unit input/output buffers, and said voice transfer control means still further comprising interrupting means for generating a signal each time one of a plurality of preselected portions of said buffer areas is filled and block transfer means responsive to signals from said first processor means for block transferring the information in said full portion to said digital mass storage means under control of said first processor means.

29. A voice/transfer storage and retrieval apparatus as described in claim 20 wherein said voice transfer control means further comprises a scratchpad memory, said scratchpad memory containing information defining the location, extent and current status of each of said buffer areas, said voice transfer control means accessing said information to determine the appropriate location in said random access memory for each input/output operation with said conversion unit input/output buffers, and said voice transfer control means still further comprising interrupting means for generating a signal each time one of a plurality of preselected portions of said buffer areas is filled and block transfer means responsive to signals from said first processor means for block transferring the information in said full portion to said digital mass storage means under control of said first processor means.

30. A voice/transfer storage and retrieval apparatus as described in claim 21 wherein said voice transfer control means further comprises a scratchpad memory, said scratchpad memory containing information defining the location, extent and current status of each of said buffer areas, said voice transfer control means accessing said information to determine the appropriate location in said random access memory for each input/output operation with said conversion unit input/output buffers, and said voice transfer control means still further comprising interrupting means for generating a signal each time one of a plurality of preselected portions of said buffer areas is filled and block transfer means responsive to signals from said first processor means for block transferring the information in said full portion to said digital mass storage means under control of said first processor means.

31. A voice/text storage and retrieval apparatus comprising:
  (a) digital mass storage means for storage and retrieval of digital data and digitized voice signal data;
  (b) communication and control means for the generation and transfer of digital command and data signal, said communications and control means further comprising:
     (b.1) a first bus;
     (b.2) host processor means operatively connected to said first bus for the generation of digital command signals for the overall control of said apparatus; and
     (b.3) communication processor means operatively connected to said bus and to a plurality of serial data lines for controlling the transmission of digital data between said first bus and said serial data lines.
  (c) voice transfer means for converting voice signals between digital and analog form and for transferring said voice signals to and from said mass storage means, said voice transfer control means including a second bus for the transfer of digitized voice signals;
  (d) interface means for interfacing a plurality of signal lines to said apparatus, said lines having the capability to carry both analog voice signals and serial digital data, said interface means including switch means for distinguishing between said analog voice signals and said serial data signals and for routing said analog voice signals between said signal lines and said voice transfer control means and for routing said serial data signals between said signal lines and said serial data lines;
  (e) storage/network processing means operatively connected to said first and second busses for controlling access to said mass storage means, said storage/network processor means further comprising:
     (e.1) a central processing unit having a private memory;
     (e.2) first direct memory access means operatively connecting said storage/network processing means to said first bus;
     (e.3) second direct memory access means operatively connecting said storage/network processing means to said second bus;
     (e.4) storage/network switch means, controlling by said central processing unit, for operatively connecting said first direct memory access means to said private memory, whereby said command data signals may be transmitted between said central processing unit and said host processing means, and for operatively connecting either said first or said second direct memory access means to said mass storage means, whereby either digital data or digitized voice may be routed to said mass storage means for storage or retrieval.

32. A voice/text storage and retrieval apparatus as described in claim 31 wherein said voice transfer means is operatively connected to first bus to respond to commands from said communications and control means to activate or inactivate communications with particular ones of said signal lines and to determine the direction of voice signal flow between said apparatus and said particular ones of said signal lines.

33. A voice/text storage and retrieval apparatus as described in claim 31 wherein said host processor means and said communications processor means communicate by transferring a block of data of said private memory of said storage/network central processing unit, under control of said first direct memory access means, for retransmittal by said storage/network processing means to the other of said communicating processor means.

34. A voice/text storage and retrieval apparatus as described in claim 32 wherein said host processor means and said communications processor means communicate by transferring a block of data to said private memory of said storage/network central processing unit, under control of said first direct memory access means, for retransmittal by said storage/network processing means to the other of said communicating processor means.

35. A voice/text storage and retrieval apparatus as described in claim 31 wherein said storage/network processing means further comprises a high-speed data communications port for connection to a high-speed parallel digital data network, and associated switch means, operating under control of said central processing unit, for providing a high-speed digital data path between said mass storage means and said network.

36. A voice/text storage and retrieval apparatus as described in claim 32 wherein said storage/network processing means further comprises a high-speed data communications port for connection to a high-speed parallel digital data network, and associated switch means, operating under control of said central processing unit, for providing a high-speed digital data path between said mass storage means and said network.

37. A voice/text storage and retrieval apparatus as described in claim 33 wherein said storage/network processing means further comprises a high-speed data communications port for connection to a high-speed parallel digital data network, and associated switch means, operating under control of said central processing unit, for providing a high-speed digital data path between said mass storage means and said network.

38. A voice/text storage and retrieval apparatus as described in claim 34 wherein said storage/network processing means further comprises a high-speed data communications port for connection to a high-speed parallel digital data network, and associated switch means, operating under control of said central processing unit, for providing a high-speed digital data path between said mass storage means and said network.

39. A voice/text storage and retrieval apparatus as described in claim 31 wherein said storage/network processing means further comprises a back-up data communications port for connection to a back-up storage device such as a tape drive and associated switch means, operating under control of said central processing unit, for providing a back-up data path whereby overflow data from said mass storage means may be saved on said back-up storage device.

40. A voice/text storage and retrieval apparatus as described in claim 32 wherein said storage/network processing means further comprises a back-up data communications port for connection to a back-up storage device such as a tape drive and associated switch means, operating under control of said central processing unit, for providing a back-up data path whereby overflow data from said mass storage means may be saved on said back-up storage device.

41. A voice/text storage and retrieval apparatus as described in claim 33 wherein said storage/network processing means further comprises a back-up data communications port for connection to a back-up storage device such as a tape drive and associated switch means, operating under control of said central processing unit, for providing a back-up data path whereby overflow data from said mass storage means may be saved on said back-up storage device.

42. A voice/text storage and retrieval apparatus as described in claim 34 wherein said storage/network processing means further comprises a back-up data communications port for connection to a back-up storage device such as a tape drive and associated switch means, operating under control of said central processing unit, for providing a back-up data path whereby overflow data from said mass storage means may be saved on said back-up storage device.

43. A voice/text storage and retrieval apparatus as described in claim 35 wherein said storage/network processing means further comprises a back-up data communications port for connection to a back-up storage device such as a tape drive and associated switch means, operating under control of said central processing unit, for providing a back-up data path whereby overflow data from said mass storage means may be saved on said back-up storage device.

44. A voice/text storage and retrieval apparatus as described in claim 36 wherein said storage/network processing means further comprises a back-up data communications port for connection to a back-up storage device such as a tape drive and associated switch means, operating under control of said central processing unit, for providing a back-up data path whereby overflow data from said mass storage means may be saved on said back-up storage device.

45. A voice/text storage and retrieval apparatus as described in claim 37 wherein said storage/network processing means further comprises a back-up data communications port for connection to a back-up storage device such as a tape drive and associated switch means, operating under control of said central processing unit, for providing a back-up data path whereby overflow data from said mass storage means may be saved on said back-up storage device.

46. A voice/text storage and retrieval apparatus as described in claim 38 wherein said storage/network processing means further comprises a back-up data communications port for connection to a back-up storage device such as a tape drive and associated switch means, operating under control of said central processing unit, for providing a back-up data path whereby overflow data from said mass storage means may be saved on said back-up storage device.

* * * * *